United States Patent
Windgassen et al.

(10) Patent No.: US 10,868,384 B1
(45) Date of Patent: Dec. 15, 2020

(54) SELF-INSULATING CONTACTS FOR USE IN ELECTROLYTIC ENVIRONMENTS

(71) Applicant: Northrop Grumman Systems Corporation, Fall Church, VA (US)

(72) Inventors: James R. Windgassen, Chester, MD (US); Harvey P. Hack, Arnold, MD (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/434,283

(22) Filed: Jun. 7, 2019

(51) Int. Cl.
| | |
|---|---|
| *H01R 13/35* | (2006.01) |
| *H01R 13/03* | (2006.01) |
| *H01R 13/523* | (2006.01) |
| *H01R 4/62* | (2006.01) |
| *H01R 43/26* | (2006.01) |
| *H01R 13/02* | (2006.01) |
| *B60L 53/16* | (2019.01) |
| *B63G 8/00* | (2006.01) |
| *B60L 53/31* | (2019.01) |
| *H02J 7/00* | (2006.01) |

(52) U.S. Cl.
CPC ............ *H01R 13/035* (2013.01); *H01R 4/62* (2013.01); *H01R 13/02* (2013.01); *H01R 13/03* (2013.01); *H01R 13/523* (2013.01); *H01R 43/26* (2013.01); *B60L 53/16* (2019.02); *B60L 53/31* (2019.02); *B60L 2200/32* (2013.01); *B63G 8/001* (2013.01); *H02J 7/0045* (2013.01)

(58) Field of Classification Search
CPC ....... H01R 13/02; H01R 13/03; H01R 13/035
See application file for complete search history.

(56) References Cited

U.S. PATENT DOCUMENTS

| | | | | |
|---|---|---|---|---|
| 3,751,296 | A | * | 8/1973 | Beer ...................... C23F 13/02 204/290.12 |
| 5,236,789 | A | | 8/1993 | Cowie et al. |
| 7,343,204 | B2 | | 3/2008 | Schulman et al. |
| 7,966,070 | B2 | | 6/2011 | Taylor et al. |
| 8,808,017 | B2 | | 8/2014 | York et al. |
| 9,197,006 | B2 | * | 11/2015 | Hack ...................... H01R 13/52 |
| 9,893,460 | B2 | * | 2/2018 | Windgassen ......... H01R 13/523 |

(Continued)

OTHER PUBLICATIONS

International Search Report and Written Opinion received in international app. No. PCT/US20/35083, dated Aug. 26, 2020 (14 pages).

*Primary Examiner* — Edwin A. Leon
*Assistant Examiner* — Matthew T Dzierzynski
(74) *Attorney, Agent, or Firm* — Edell, Shapiro & Finnan, LLC

(57) ABSTRACT

An electrical connector is provided for supplying power in an electrolytic environment. The connector includes first and second mating contacts, each of which is coated with an electrically conductive material that includes a transition metal capable of forming a non-conductive passivation layer in an electrolytic environment. Each contact includes a substrate covered by the electrically conductive coating. The substrate may be formed of a material that is not capable of forming a non-conductive passivation layer in the electrolytic environment. The substrate material for each contact may be conductive or non-conductive, and may have different material properties than the electrically conductive coating.

20 Claims, 4 Drawing Sheets

(56) References Cited

U.S. PATENT DOCUMENTS

| | | |
|---|---|---|
| 10,287,689 B2 * | 5/2019 | Yoshida .................... C23F 1/30 |
| 2003/0219622 A1 | 11/2003 | Niebauer |
| 2004/0043675 A1 | 3/2004 | Hiatt |
| 2007/0260282 A1 | 11/2007 | Taylor et al. |
| 2009/0297841 A1 | 12/2009 | Sasaoka |
| 2015/0011107 A1 | 1/2015 | Hack |
| 2015/0260282 A1 | 9/2015 | Arnold et al. |
| 2016/0233607 A1 | 8/2016 | Windgassen et al. |
| 2020/0169184 A1 | 5/2020 | Windgassen et al. |

* cited by examiner

SELF-INSULATING CONTACTS FOR USE IN ELECTROLYTIC ENVIRONMENTS

FIELD OF THE INVENTION

This disclosure relates generally to electrical connectors and, more particularly, to electrical connectors with self-insulating contacts for use in electrolytic environments.

BACKGROUND

To avoid water contamination, conventional electrical connectors with mating contacts may be sealed by o-rings or gaskets. These designs may work well in generally dry environments; however, in some applications, there may be a need to utilize electrical connectors in non-dry or wet environments. For example, electrical connectors on ships, submarines, and underwater equipment may be submerged in water. Water can create electricity leakage paths and can damage the electrically conducting connector contacts by corrosion or by deposition of insulating salts or impurities onto the connectors. Thus, it may be desirable to exclude water from the electrically live portions of the connectors both during and after underwater mating.

Conventional connectors addressing underwater mating or mating in a wet environment may be complex. Such connectors may be filled with oil or a dielectric gel and may have many small parts, such as dynamic seals and springs, for example. Due, at least in part, to their complexity, conventional connectors may be difficult to build and repair. Such connectors may also be expensive to produce and replace. Also, repeated connection and disconnection of oil-containing connectors may lead to contamination, leakage of the oil, or other problems. One method of making underwater electrical connections is by using solid contacts made entirely from transition metals such as niobium, e.g., as disclosed in U.S. Pat. No. 9,893,460, the disclosure of which is incorporated by reference herein in its entirety.

SUMMARY OF THE INVENTION

Disclosed herein are improved electrical connectors and methods for making electrical connections in an electrolytic environment, for example to supply electrical power in underwater applications.

In accordance with a first aspect, an electrical connector is provided. The electrical connector comprises first and second mating contacts. The first electrical contact includes a first substrate made of a first material and a first electrically conductive coating made of a second material that covers the first substrate. The second material includes a sufficient amount by weight of a transition metal to form a non-conductive passivation layer on the first electrically conductive coating when the first electrical contact is immersed in an electrolytic environment. The second electrical contact includes a second substrate made of a third material and a second electrically conductive coating made of a fourth material that covers the second substrate. The fourth material includes a sufficient amount by weight of a transition metal to form a non-conductive passivation layer on the second electrically conductive coating when the second electrical contact is immersed in an electrolytic environment. The first and third materials are different than the second and fourth materials, respectively, e.g., they may not be capable of forming a non-conductive passivation layer when immersed in an electrolytic environment, and an initial thickness of the first and second electrically conductive coatings is such that abrasion associated with coupling and decoupling the first and second electrical contacts does not expose either of the first and second substrates.

In accordance with a second aspect, a method of making an electrical connection in an electrolytic environment is provided. The method comprises the steps of forming a non-conductive passivation layer on a first electrically conductive coating of a first electrical contact by immersing the first electrical contact in an electrolytic environment, wherein the first electrical contact includes a first substrate made of a first material that is different than the first electrically conductive coating (e.g., it may not be capable of forming a non-conductive passivation layer when exposed to the electrolytic environment) and the first electrically conductive coating is made of a second material including a sufficient amount by weight of a transition metal to form a non-conductive passivation layer on the first electrically conductive coating when the first electrical contact is immersed in the electrolytic environment, forming a non-conductive passivation layer on a second electrically conductive coating of a second electrical contact by immersing the second electrical contact in an electrolytic environment, wherein the second electrical contact includes a second substrate made of a third material that is different than the second electrically conductive coating (e.g., it may not be capable of forming a non-conductive passivation layer when exposed to the electrolytic environment) and the second electrically conductive coating is made of a fourth material including a sufficient amount by weight of a transition metal to form a non-conductive passivation layer on the second electrically conductive coating when the second electrical contact is immersed in the electrolytic environment, mating the first and second electrical contacts in the electrolytic environment, wherein during the mating, sufficient portions of the non-conductive passivation layers are removed to allow the electrically conductive coatings to conduct electricity, applying electrical power across the first and second electrical contacts in the electrolytic environment, and decoupling the first and second electrical contacts in the electrolytic environment, wherein an initial thickness of the first and second electrically conductive coatings is such that abrasion associated with coupling and decoupling the first and second electrical contacts does not expose either of the first and second substrates.

By forming each contact with a substrate having specific properties and covering it with an electrically conductive coating that is capable of forming a non-conductive passivation layer, it is possible to more reliably and economically make electrical connections in an electrolytic environment. For example, the substrate may have mechanical properties (e.g., stiffness, yield strength, ultimate strength) that are greater than or superior to the self-passivating electrically conductive coating, thereby improving mechanical reliability of the connection. Also, the substrate may have greater electrical conductivity than the electrically conductive coating, thereby improving electrical performance of the connection. Additionally, substrate materials of lesser cost than the electrically conductive coating materials may be used to reduce the cost of the connector. For example, the substrate may be made of a material including a metal (e.g., copper, brass, aluminum, steel, or titanium) or a non-conductive material (e.g., ceramic, glass, or polymer), and the self-passivating electrically conductive coating may be made of a transition metal (e.g., niobium, tantalum, and alloys thereof). Since transition metals tend to be more expensive than other types of conductors, making the electrically conductive coatings thicker on respective contacting portions of the contacts than on respective non-contacting portions of the contacts may also reduce the cost of the connector without impairing performance.

An example embodiment of the invention is described below with reference to the following drawing figures, in which like reference numerals in the various figures are utilized to designate like components.

DESCRIPTION OF EXAMPLE EMBODIMENTS

This disclosure relates to an electrical connector and method for making electrical connections underwater or in other electrolytic environments. Such electrical connections can be made for a variety of purposes including, without limitation, to supply electrical power, signals, and/or data. As described in greater detail below, example embodiments facilitate connecting and disconnecting an electrical connector in an electrolytic environment without current leakage or other adverse effects. The term "electrolytic environment" is used broadly herein to mean any environment containing an electrolyte that dissociates into ions in the environment to conduct electricity, such as bodies of water (e.g., salt water, well water, lake water, river water) that include enough mineral content to support current leakage flows.

Figure 1:
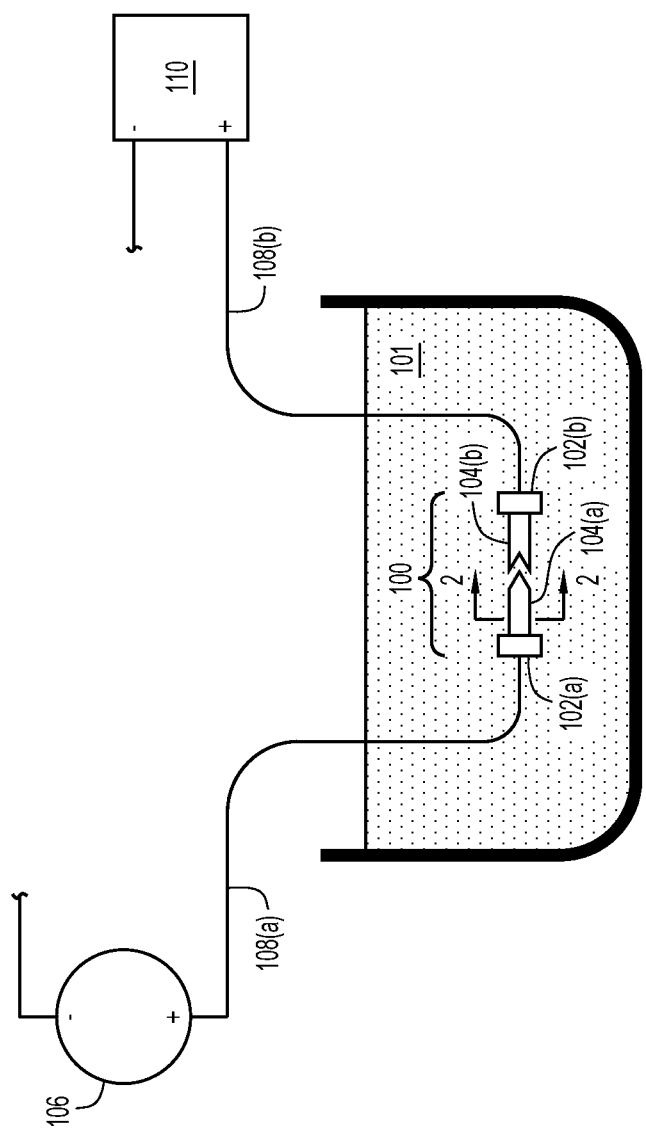
FIG. 1 is an illustration of an electrical connector with self-passivating contacts according to an example embodiment of the invention.

FIG. 1 illustrates an example embodiment of an electrical connector 100 according to the invention in a disconnected condition or state in an electrolytic environment 101. The electrical connector 100 includes a first housing 102(a) that includes a first contact 104(a) and a second housing 102(b) that includes a second contact 104(b) configured to mate with the first contact. The first contact 104(a) is shown connected to an anode (positive) terminal of a power source 106 via a first wire or conductor 108(a), and the second contact 104(b) is shown connected to an anode (positive) terminal of a load 110 via a second wire or conductor 108(b). A return path from the cathode (negative) terminal of the load 110 to the cathode (negative) terminal of the power source 106 may be formed through additional contacts in the same electrical connector or a separate electrical connector. If a separate electrical connector is used to complete the circuit, the separate electric connector may be configured to be disposed in the electrolytic environment (e.g., as described herein) or configured for use outside the electrolytic environment. Examples of circuits in which electrical connectors according to the invention may be used are shown and/or described in U.S. Pat. No. 9,893,460 and U.S. patent application Ser. No. 16/200,147, filed on Nov. 26, 2018, the disclosures of which are incorporated by reference herein.

In the example embodiment shown in FIG. 1, the first contact 104(a) is a male contact in the form of a pin or plug and the second contact 104(b) is a female contact in the form of a socket configured to receive the pin or plug. The pin and socket are configured so that conductive portions of the pin and socket make contact with one another when mated to form an electrical connection. While the electrical connector is shown having pin and socket contacts, it will be appreciated that other types of contacts can be used, including without limitation terminal blocks, binding posts, blades, rings, spades, clips, plates, coaxial contacts, and combinations of the foregoing. The term "mate" is used broadly herein to mean physically connect or contact.

Connector housings 102(a) and 102(b) in the example embodiment shown in FIG. 1 are configured to mount or hold non-mating ends of the contacts 104(a) and 104(b), respectively. The connector housings 102(a) and 102(b) in FIG. 1 are configured to facilitate handling of the electrical connector 100 without touching the contacts 104(a) and 104(b) or exposed (e.g., uninsulated) ends of wires 108(a) and 108(b) where they connect with the contacts. In some embodiments, the connector housings can be configured to connect with one another (e.g., by providing one housing with external screw threads and the other housing with internal screw threads, by providing one housing with a pin and the other housing with a slot to receive the pin, by configuring one housing to fit within the other housing with a friction fit, and other known couplings). In some embodiments, a housing may be configured to be attached to another structure (e.g., an underwater device or vehicle). For example, a housing may include a plate with holes formed therein allowing the housing/contact assembly to be attached to a structure with screws or bolts. While connector housings can be advantageous in certain applications, it will be appreciated that housings are optional and that the electrical connector can be made with both contacts having housings (e.g., as shown), one contact having a housing and the other contact not having a housing, or neither contact having a housing. It will be appreciated that connector housings may be advantageous when the electrical connector includes more than one pair of mating contacts (i.e., to make a plurality of electrical connections), to maintain a set alignment of contacts and allow for quicker connections and disconnections.

Figure 2:
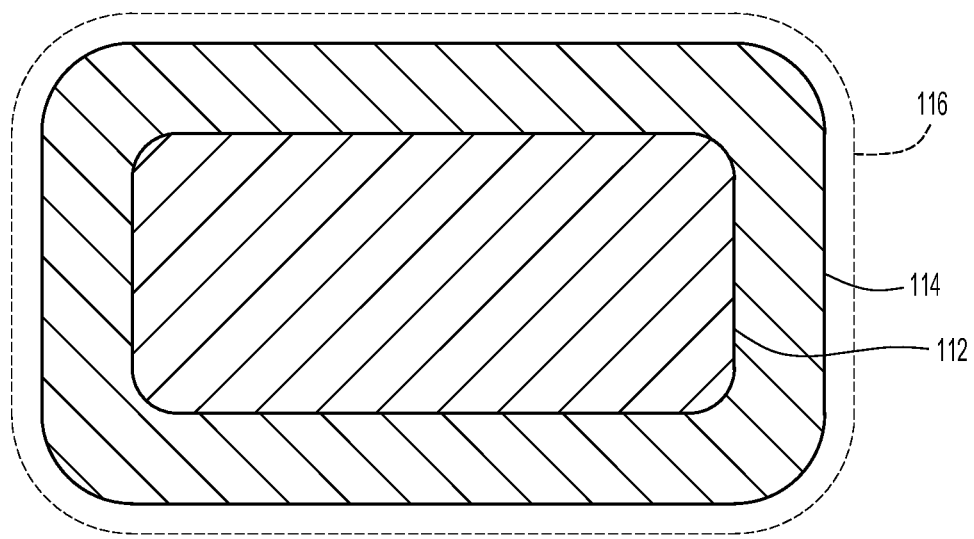
FIG. 2 is a cross-sectional view of a contact in the electrical connector of FIG. 1, taken through line 2-2.

FIG. 2 shows a cross-section of the first contact 104(a), taken through line 2-2 in FIG. 1. The second contact 104(b) can have a similar cross-section. In the example embodiment, the contacts each have a substrate 112 and an electrically conductive coating 114 covering the substrate. In the example embodiment shown, the electrically conductive coating 114 covers the entire substrate to prevent the substrate from being exposed to an electrolytic environment when the electrical connection is connected or disconnected. This is particularly advantageous when the substrate is electrically conductive but non-self-passivating. In other embodiments, e.g., when the substrate is not electrically conductive, the electrically conductive coating may cover only a portion of the substrate (e.g., a contacting portion), such that other portions (e.g., non-contacting portions) of the substrate may be exposed to the electrolytic environment when the electrical connector is connected or disconnected.

To reduce the possibility of current leakage when connecting or disconnecting the electrical connector in an electrolytic environment, the electrically conductive coating 114 is preferably made of a conductive material including a sufficient amount by weight of a self-passivating transition metal (such as niobium (Nb), tantalum (Ta), titanium (Ti), zirconium (Zr), molybdenum (Mo), ruthenium (Ru), rhodium (Rh), palladium (Pd), hafnium (Hf), tungsten (W), rhenium (Re), osmium (Os), or iridium (Ir)), which has a property to form a non-conductive passivation layer when immersed in an electrolytic environment. For example, the electrically conductive coating 114 can be made of a pure transition metal such as pure niobium, a slightly less pure alloy of a transition metal such as commercial grade niobium (which contains only a small percentage of another material), an alloy of niobium (such as 99% niobium-1% zirconium by weight), or mixtures of any of the transition metals in any proportions (such as 50% niobium-50% tantalum by weight). Preferably, the electrically conductive coating contains at least 50% by weight of a transition metal (or 50% by weight of a combination of transition metals) to ensure formation, in an electrolytic environment, of a passivation layer that is effectively non-conductive.

As indicated above, the substrate 112 can be made of an electrically conductive material or a non-conductive material. Examples of electrically conductive materials that may be used for the substrate 112 include but are not limited to: (1) copper or brass to improve stiffness, electrical conductivity or thermal conductivity of the contact in comparison to a contact made entirely of the electrically conductive self-passivating material; (2) titanium alloys to increase stiffness of the contact in comparison to a contact made entirely of the electrically conductive self-passivating material; (3) aluminum alloys to improve electrical or thermal conductivity of the contact in comparison to a contact made entirely of the electrically conductive self-passivating material; (4) spring steel to improve stiffness of the contact in comparison to a contact made entirely of the electrically conductive self-passivating material; or (5) brass or spring steel to improve yield strength of the contact in comparison to a contact made entirely of the electrically conductive self-passivating material. Examples of electrically non-conductive materials that may be used for the substrate 112 include but are not limited to: (1) ceramics or glass to improve stiffness of the contact in comparison to a contact made entirely of the electrically conductive self-passivating material; or (2) polymers to improve flexibility of the contact in comparison to a contact made entirely of the electrically conductive self-passivating material.

If an electrically conductive substrate is used for the contacts, the electrically conductive coating 114 should preferably completely cover portions of the substrate 112 that would otherwise be exposed to the electrolytic environment. Regardless of whether the substrate is electrically conductive or electrically non-conductive, the coating 114 should be sufficiently thick to maintain electrical conductivity and prevent electrolyte penetration through the coating over the lifetime of the contact. That is, an initial thickness of the electrically conductive coating 114 should be sufficiently thick to ensure that abrasion associated with coupling and decoupling the contact does not expose the substrate material under the coating. On the other hand, the electrically conductive coating 114 is preferably thin enough so that the properties of the substrate 112 dominate the cost, electrical performance, and/or mechanical performance of the contact. For example, depending upon process variations and potential coating defect size, the initial thickness of the electrically conductive coating 114 can range from a little as 25 microns up to as much as 50% of the substrate thickness.

In a preferred embodiment, the coated contact is configured to have improved mechanical properties, lower electrical resistance, and cost less than a solid contact made entirely from the coating material while still providing the electro-chemical properties of the coating material. A contact that is coated as described herein should preferably have superior properties to a contact made entirely of the coating material.

For a coated contact to provide an advantage over a contact made from the pure coating material, the effective stiffness (Young's Modulus) of the coated contact should preferably be at least 125% of the stiffness of the pure coating material, and/or the effective thermal conductivity should preferably be at least 125% of the thermal conductivity of the pure coating material, and/or the electrical conductivity should preferably be at least 125% of that of the pure coating materials, and/or the effective Yield Strength should preferably be at least 125% of that of the pure coating material, and/or the effective Ultimate Tensile Strength should preferably be at least 125% of that of the pure coating material. The coating should preferably be essentially defect free, i.e. no ability for ions to contact the core material through defects or porosity in the coating.

For example, in one embodiment, improved mechanical properties, lower electrical resistance, and reduced cost can be achieved by providing a contact with a thin (e.g., 25 microns) coating of niobium metal over a much thicker copper alloy core (e.g., at least 250 microns thick). In the previous example, the mechanical properties can be further improved if the substrate is made of a copper-beryllium alloy. The cost of a contact may be lower than a solid contact made from the coating material if the coating is put over a less expensive material. An example of this would be cladding niobium metal over a steel core.

For contacts in which a coating is applied over an electrically non-conductive core, the coating should preferably be thick enough to provide sufficient electrical conductivity for the application, while not being so thick that the core material provides no advantage, in terms of mechanical properties and/or cost, over a contact made solely from the coating material. For example, the coating thickness should preferably be no more than 40% of the cross-section of the coated contact.

Some examples of coating or cladding processes that may be used to apply the self-passivating electrically conductive coating on the substrate include but are not limited to electroplating, explosion bonding, co-drawing, co-rolling, vacuum brazing, cold-spray, plasma spraying, high-velocity-oxy-fuel (HVOF) spraying, plasma vapor deposition (PVD), interference or shrink fitting, weld cladding, powder sintering, sputtering, and casting of the core into a shell of the cladding material.

Furthermore, it should be understood that a thickness of the self-passivating electrically conductive coating need not be constant across the surface area of a contact. The coating may be thicker in areas where there may be a possibility of damage and thinner in areas where it is desirable for substrate properties to dominate.

It should also be understood that when the anodic (positive) contacts 104(*a*) and 104(*b*) described above are used in combination with other contacts connected to cathodic (negative) terminals of the load 110 and power supply 106, the cathodic contacts may be of the same construction as the anodic contacts described above or of different construction. For example, the cathodic contacts may be made entirely of electrically conductive materials that are not self-passivating and may be in the same or different electrolyte as the anodic contacts.

In use, a first contact 104(*a*) of connector 100 may be connected to a positive (anodic) terminal of a power supply, and a second contact 104(*b*) may be connected to a positive (anodic) terminal of a load 110. Contacts 104(*a*) and 104(*b*)

of connector 100 may be positioned in an electrolytic environment 101. For example, the connector 100 may be immersed in an electrolytic environment in a disconnected condition or state such that contacts 104(*a*) and 104(*b*) are exposed to the electrolytic environment. Exposure of the contacts 104(*a*) and 104(*b*) to the electrolytic environment causes the self-passivating electrically conductive coatings 114 on each of the contacts to grow a passivation layer 116 to provide insulation from the electrolytic environment, and thus, prevent current leakage from the exposed contacts into the environment. The contacts 104(*a*) and 104(*b*) effectively "grow" their own insulation in any area of the coating 114 which is exposed to the electrolytic environment. Thus, for example, rather than trying to rely on complex seals and oil to exclude water as in a conventional wet-mate connector, the connector 100 may utilize water being in contact with the contacts 104(*a*) and 104(*b*) to form the insulation. After the passivation layer has formed, the leakage current from the contacts 104(*a*) and 104(*b*) substantially reduces toward zero current.

The connector contacts 104(*a*) and 104(*b*) can be mated by aligning the contacts and guiding them toward one another until they mate. If the connector 100 includes housings 102(*a*) and 102(*b*), a user may grasp the housings in order to more easily align the contacts and mate them without touching the contacts. At least a portion of the non-conductive passivation layer 116 on each contact is physically removed, e.g., by scraping and/or abrading, when the contacts are mated. The term "physically removed" should be construed broadly to mean completely removed or mostly removed (e.g., a portion of the non-conductive passivation layer thin enough to exhibit semiconductor-like properties may remain). It has also been found that a portion of the electrically conductive coating is converted to re-form the passivation layer when the contacts are de-mated; however, as noted above, the contacts are preferably configured to have self-passivating electrically conductive coatings with thicknesses sufficient to grow an insulating passivation layer and establish low resistance electrical connections over a lifetime of connections and disconnections. Removal of the passivation layer 116 exposes the electrically conductive coating 114 on each contact so that a low resistance electrical connection can be made between the contacts 104(*a*) and 104(*b*) where respective passivation layers have been removed. The low resistance connection provides an electrical connection (electrical medium) through which power and/or data can be exchanged.

If the connector 100 is disconnected in the electrolytic environment, a portion of the self-passivating electrically conductive coating 114 is converted to re-form the passivation layer, but the thickness of the coating is such that a sufficient amount of transition metal remains to re-grow a passivation layer 116 on the contacts. The passivation layer 116 provides insulation from the electrolytic environment, and helps prevent current leakage from the exposed contacts into the environment.

Figure 4:
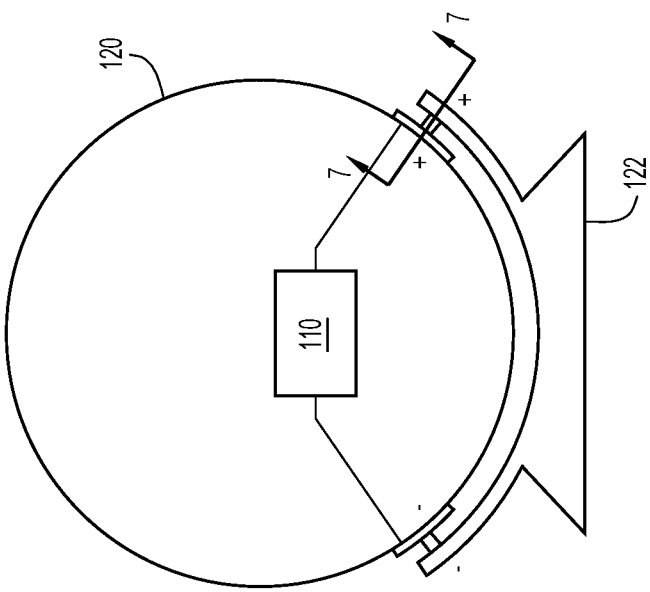
FIGS. 3 and 4 are plan views of an underwater vehicle and charging base using an electrical connector with self-passivating contacts according to an example embodiment of the invention.
Figure 3:
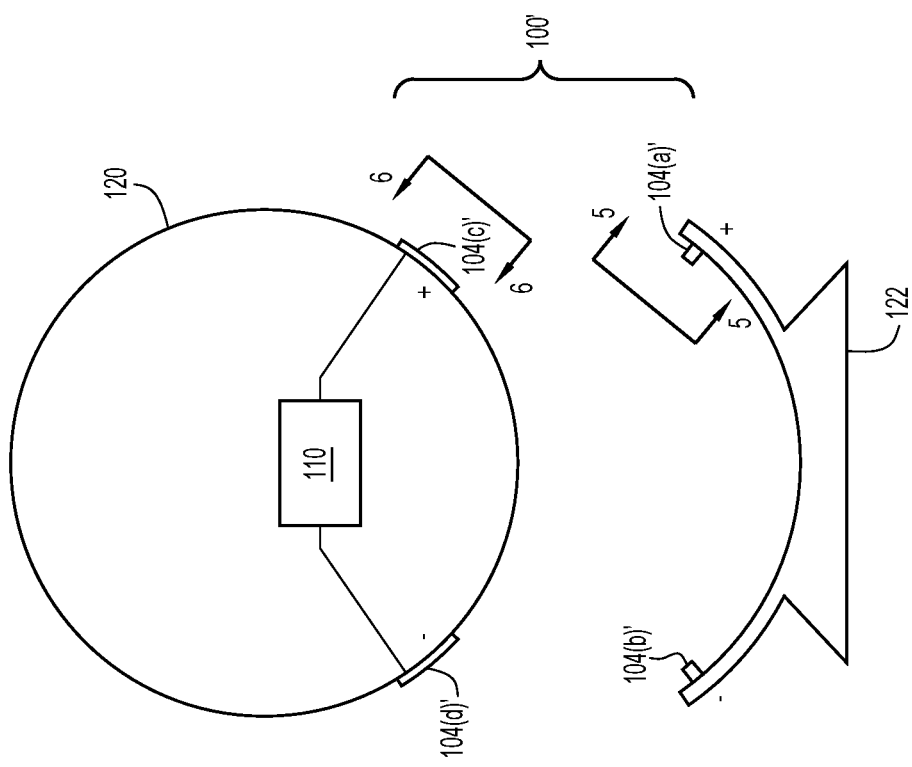

FIGS. 3 and 4 are sectional plan views of an underwater vehicle 120 and charging base 122 utilizing electrical connectors 100' according to an example embodiment of the invention. In some embodiments, the underwater vehicle 120 may be a submarine or an underwater drone powered by one or more rechargeable batteries and including a rechargeable battery and charging circuit (load 110). The underwater vehicle 120 may have a convex outer surface, and the charging base 122 may have a concave surface configured to serve as a dock for the underwater vehicle. The underwater vehicle 120 is shown in an undocked condition or state in FIG. 3 in which the electrical connectors 100' are disconnected, and is shown in a docked condition or state in FIG. 4 in which the electrical connectors 100' are connected and the one or more batteries contained in load 110 are charging.

The charging base 122 includes a first contact 104(*a*)' connected to the positive (anodic) terminal of a power supply (not shown) and a second contact 104(*b*)' connected to the negative (cathodic) terminal of the power supply. The underwater vehicle mounts a third contact 104(*c*)' configured to mate with the first contact 104(*a*)' and a fourth contact 104(*d*)' configured to mate with the second contact 104(*b*)'. The first and third contacts 104(*a*)' and 104(*c*)' comprise the first electrical connector, and the second 104(*b*)' and fourth contacts 104(*d*)' comprise the second electrical connector. In an example embodiment, the third contact 104(*c*)' may be connected to the positive (anodic) terminal of the load 110, and the fourth contact 104(*d*)' may be connected to the negative (cathodic) terminal of the load.

Figure 5:
FIGS. 5 and 6 are plan views of the connector contacts in FIG. 3, taken through lines 5-5 and 6-6, respectively.
Figure 6:
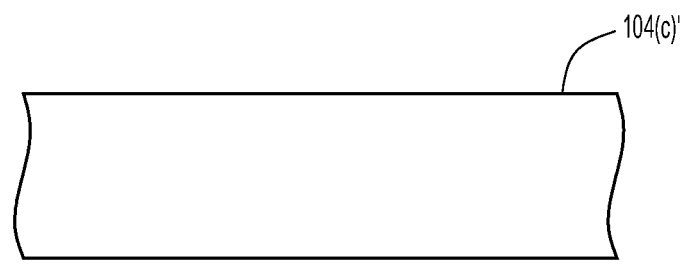
Figure 7:
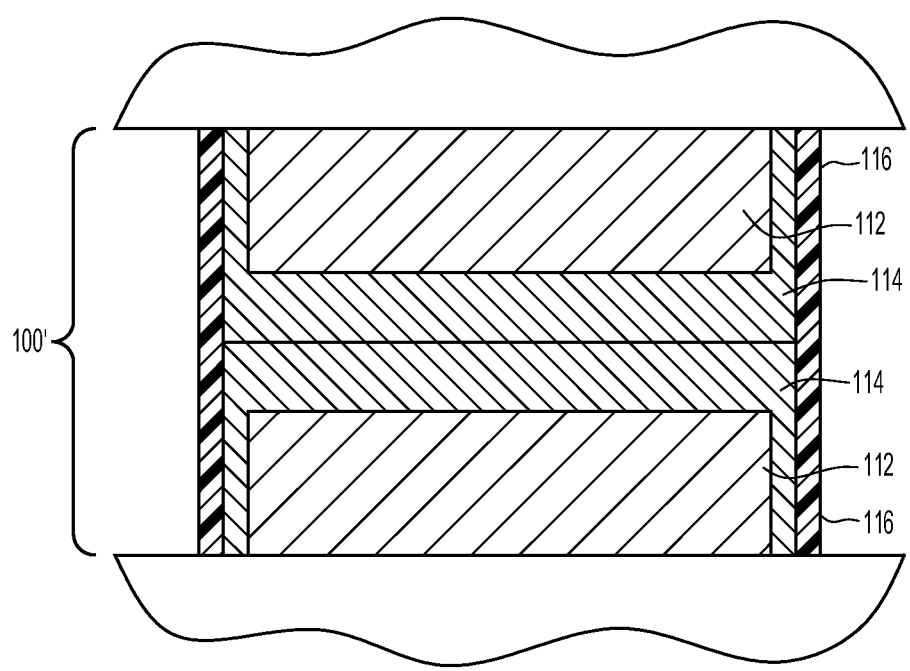
FIG. 7 is a cross-sectional view of the contacts in FIG. 4, taken through line 7-7.

FIGS. 3 and 4 show sectional end views of the contacts 104(*a*)'-104(*d*)', looking aft from the front of the underwater vehicle 120. FIGS. 5 and 6 show side views of the contacts 104(*a*)' and 104(*c*)', respectively. FIG. 7 shows a cross-sectional view of the contacts 104(*a*)' and 104(*c*)' taken through line 7-7 in FIG. 4. It can be seen that the contacts 104(*a*)'-104(*d*)' in the example embodiment are elongate strips or rails oriented parallel to a longitudinal axis of the underwater vehicle 120. The contacts 104(*a*)'-104(*d*)' may have a cross-sectional configuration like contacts 104(*a*) and 104(*b*) described above. That is, the contacts may include a conductive or non-conductive substrate 112 and a self-passivating electrically conductive coating 114 as described above. However, in some embodiments, cathodic (negative) contacts 104(*b*)' and 104(*d*)' may be of different construction than the anodic contacts 104(*a*) and 104(*b*) described above. For example, the cathodic contacts may be formed entirely using electrically conductive materials that are not self-passivating.

Comparing FIGS. 4, 5, and 7, it can be seen that little or none of the passivation layer 116 remains on the points of touching of the contacts 104(*a*)' and 104(*c*)' due to abrasion caused by the docking maneuver. Thus, the electrically conductive coatings 114 are in sufficient contact with one another to allow conduction of electricity across the connection. It will be noted that the passivation later 116 on non-contacting sides of the contacts is still intact. Furthermore, it will be noted that, in this example, a thickness of the self-passivating electrically conductive coating on contacting sides of the contacts is thicker than on non-contacting sides.

It will be appreciated that the example embodiments described above and illustrated in the drawings represent only a few of the many ways of implementing the invention. Many modifications and variations will be apparent to those of ordinary skill in the art without departing from the scope and spirit of the invention.

What is claimed is:

1. An electrical connector comprising:
    a first electrical contact including a first substrate made of a first material and a first electrically conductive coating made of a second material that covers the first substrate, wherein the second material includes a sufficient amount by weight of a transition metal to form a non-conductive passivation layer on the first electrically conductive coating when the first electrical contact is immersed in an electrolytic environment; and
    a second electrical contact configured to mate with the first electrical contact, wherein the second electrical contact includes a second substrate made of a third material and a second electrically conductive coating made of a fourth material that covers the second substrate, and wherein the fourth material includes a sufficient amount by weight of a transition metal to form a non-conductive passivation layer on the second electrically conductive coating when the second electrical contact is immersed in an electrolytic environment; and wherein the first and third materials are different than the second and fourth materials, respectively, and wherein an initial thickness of the first and second electrically conductive coatings is such that abrasion associated with coupling and decoupling the first and second electrical contacts does not expose either of the first and second substrates.

2. The electrical connector of claim 1, wherein the first and third materials have respective electrical conductivities that are greater than respective electrical conductivities of the transition metals in the first and second electrically conductive coatings.

3. The electrical connector of claim 1, wherein the first and third materials are metals that are not capable of forming a non-conductive passivation layer when immersed in an electrolytic environment.

4. The electrical connector of claim 3, wherein the first and third materials each include a metal selected from the group consisting of copper, brass, aluminum, steel and titanium.

5. The electrical connector of claim 1, wherein the first and third materials are non-conductive.

6. The electrical connector of claim 5, wherein the first and third materials are selected from the group consisting of ceramic, glass, and polymer.

7. The electrical connector of claim 1, wherein the first and third materials each have at least one of an elastic modulus, a yield strength, and an ultimate strength that is greater than an elastic modulus, a yield strength, and an ultimate strength of the transition metal in the corresponding first and second electrically conductive coatings.

8. The electrical connector of claim 7, wherein the respective elastic moduli, yield strength, and ultimate strength of the first and third materials is at least 125% greater than the respective elastic moduli, yield strength, and ultimate strength of the transition metals in the first and second electrically conductive coatings.

9. The electrical connector of claim 1, wherein the first and second coatings include at least one self-passivating transition metal selected from the group consisting of: niobium (Nb), tantalum (Ta), titanium (Ti), zirconium (Zr), molybdenum (Mo), ruthenium (Ru), rhodium (Rh), palladium (Pd), hafnium (Hf), tungsten (W), rhenium (Re), osmium (Os), and iridium (Ir).

10. The electrical connector of claim 1, wherein the first and second contacts include contacting and non-contacting portions, and wherein respective thicknesses of the first and second electrically conductive coatings on the respective contacting portions are different than respective thicknesses of the first and second electrically conductive coatings on the respective non-contacting portions.

11. The electrical connector of claim 1, wherein respective thicknesses of the first and second electrically conductive coatings are no more than 40% of respective thicknesses of the first and second contacts.

12. A method of making an electrical connection in an electrolytic environment, the method comprising the steps of:

forming a non-conductive passivation layer on a first electrically conductive coating of a first electrical contact by immersing the first electrical contact in an electrolytic environment, wherein the first electrical contact includes a first substrate made of a first material and the first electrically conductive coating is made of a second material including a sufficient amount by weight of a transition metal to form a non-conductive passivation layer on the first electrically conductive coating when the first electrical contact is immersed in the electrolytic environment;

forming a non-conductive passivation layer on a second electrically conductive coating of a second electrical contact by immersing the second electrical contact in an electrolytic environment, wherein the second electrical contact includes a second substrate made of a third material and the second electrically conductive coating is made of a fourth material including a sufficient amount by weight of a transition metal to form a non-conductive passivation layer on the second electrically conductive coating when the second electrical contact is immersed in the electrolytic environment, wherein the first and third materials are different than the second and fourth materials, respectively;

mating the first and second electrical contacts in the electrolytic environment, wherein during the mating, sufficient portions of the non-conductive passivation layers are removed to allow the electrically conductive coatings to conduct electricity;

applying electrical power across the first and second electrical contacts in the electrolytic environment; and de-mating the first and second electrical contacts in the electrolytic environment, wherein an initial thickness of the first and second electrically conductive coatings is such that abrasion associated with coupling and decoupling the first and second electrical contacts does not expose either of the first and second substrates.

13. The method of claim 12, wherein the first and third materials have respective electrical conductivities that are greater than respective electrical conductivities of the transition metals in the first and second electrically conductive coatings.

14. The method of claim 12, wherein the first and third materials each include a metal selected from the group consisting of copper, brass, aluminum, steel, and titanium.

15. The method of claim 12, wherein the first and third materials are non-conductive.

16. The method of claim 15, wherein the first and third materials each include a material selected from the group consisting of a ceramic, a glass, and a polymer.

17. The method of claim 12, wherein at least one of the respective elastic moduli, yield strength, and ultimate strength of the first and third materials is at least 125% greater than the respective elastic moduli, yield strength, and ultimate strength of the transition metals in the corresponding first and second electrically conductive coatings.

18. The method of claim 12, wherein the first and second coatings include at least one self-passivating transition metal selected from the group consisting of: niobium (Nb), tantalum (Ta), titanium (Ti), zirconium (Zr), molybdenum (Mo), ruthenium (Ru), rhodium (Rh), palladium (Pd), hafnium (Hf), tungsten (W), rhenium (Re), osmium (Os), and iridium (Ir).

19. The method of claim 12, wherein the first and second contacts include contacting and non-contacting portions, and wherein respective thicknesses of the first and second electrically conductive coatings on the respective contacting portions are different than respective thicknesses of the first and second electrically conductive coatings on the respective non-contacting portions.

20. The method of claim 12, wherein respective thicknesses of the first and second electrically conductive coatings are no more than 40% of respective thicknesses of the first and second contacts.

\* \* \* \* \*